May 2, 1967　　　J. E. PEEK ETAL　　　3,317,793
CIRCUITS FOR PROTECTING ELECTRICAL POWER SOURCES
Filed Oct. 5, 1964
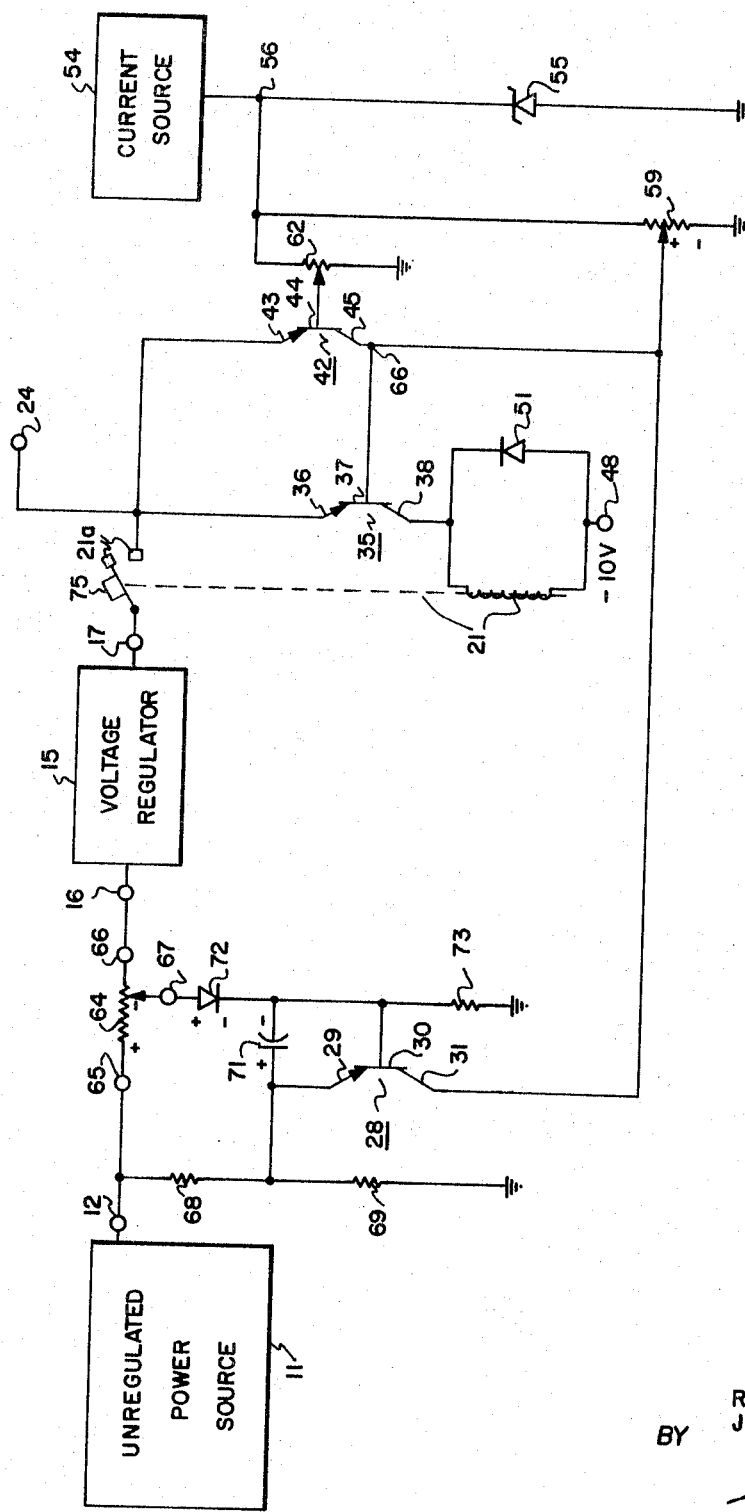
INVENTORS
ROBERT B. WHITE
JOHN E. PEEK
BY United States Patent Office 3,317,793
Patented May 2, 1967

3,317,793
CIRCUITS FOR PROTECTING ELECTRICAL
POWER SOURCES
John E. Peek and Robert B. White, Phoenix, Ariz., assignors to General Electric Company, a corporation of New York
Filed Oct. 5, 1964, Ser. No. 401,466
13 Claims. (Cl. 317—31)

This invention relates to circuits for protecting electrical power sources and more particularly to circuits which protect electrical power sources against over-voltage and over-current conditions and monitor under-voltage conditions.

An electrical power source which provides an output voltage having a substantially constant value, may comprise one or more regulator devices connected between a primary power source and an output terminal. The primary supply source provides a voltage which may vary due to variations in current required by a load circuit. The regulator receives the varying voltage at a regulator input terminal and delievers a voltage having a smaller fluctuation at a regulator output terminal. The complete regulated electrical power source consists of the primary power source and the regulator or regulators used. Under certain conditions of operation, currents drawn from a regulated electrical power source may produce excessive power dissipation within the regulator device. For example, overload currents may arise from an accidental short circuiting of the electrical power source as well as from the malfunctioning of the load circuit connected to the electrical power source output terminal.

In this application over-voltage shall mean a voltage having more than a first allowable value. Under-voltage shall means a voltage having less than a second allowable value. Over-current shall mean a current having more than an allowable value.

It is well known that solid state devices are particularly susceptible to damage due to over-voltage or over-current conditions even of short periods. In order to protect solid state regulator devices, fuses in low ranges of amperage and delicate quick-acting circuit breakers have been connected in the circuit. However, the response time of the fuses hase been too long and the operation of circuit breakers has not been wholly satisfactory because of cost. Also, the response time of circuit breakers for use with electric power sources delivering large value of current has been too long.

To insure reliable operation of load circuits employed in many types of equipment, it is also important to insure that a voltage having at least a predetermined minimum value be applied to these circuits whenever they are in operation.

It is desirable to provide an inexpensive circuit which will protect the regulator device from over-voltage and over-current and will protect the load circuits from over-voltage and under-voltage conditions.

It is, therefore, the principal object of this invention to provide an improved over-voltage, under-voltage and over-current protection circuit.

Another object is to provide a more reliable over-voltage, under-voltage and over-current protection circut.

Another object is to provide a fast-acting over-voltage, under-voltage and over-current protection circuit.

Another object is to provide an inexpensive over-voltage, under-voltage and over-current protection circuit.

The foregoing objects are achieved in a novel circuit employing only one fast-acting relay and three transistors to protect the electric power source and the associated electronic load circuits against over-voltage, under-voltage and over-current conditions. The first of these transistors compares the voltage of the electric power source against a first constant voltage. A relay coil in the circuit of this first transistor is energized whenever the voltage of the regulated power source is greater than a threshold value determined by the constant voltage. The contacts of the relay connect the output terminal of the regulated power source to the input terminal of the load circuit. When the voltage of the power source is less than the threshold value, the relay is no longer energized so that the load circuit is disconnected from the power source.

The second of these transistors compares the voltage of the electric power supply against a second constant voltage. When the voltage of power source increases above a second threshold value determined by the second constant voltage, the second transistor supplies a signal which causes the first transistor to de-energize the relay, thus, disconnectiing the load circuit from the power source.

The third of these transistors is coupled to a resistor which senses the value of current flowing from the power source to the load circuit. When the current from the power source increases above a predetermined value, the third transistor supplies a signal which causes the first transistor to de-energize the relay, thus, disconnecting the load circuit from the power source. Thus, one relay and three transistors are employed to simultaneously protect power source circuits against over-voltage and over-current conditions and protect the load circuits from over-voltage and under-voltage conditions.

Accordingly, the three transistors and their associated circuit parameters form a comparator circuit. The voltage of the power source is compared against two constant voltages. The comparator circuit disables the power source when the voltage from the power source falls outside certain limits. The comparator circuit is also employed to check the voltage across a current sensing resistor and to disable the power source when current from the power source exceeds a predetermined value.

In prior art circiuts the entire power source current flows through the relay coil or circuit breaker. In the novel circuit of the instant invention, only a small portion of the curernt from the power source flows through the relay coil. Thus, in the circuit of the instant invention a smaller, less expensive, faster-acting relay can be employed than is used in prior art circiuts.

Other objects and advantages of the invention will become apparent from the following detailed description when taken in connection with the accompanying drawing, wherein:

The drawing discloses a circuit diagram of an embodiment of the instant invention.

An unregulated power source 11 having a source-output terminal 12 supplies an unregulated voltage to the circuit. A voltage regulator 15 receives the unregulated voltage at a regulator-input terminal 16 and provides a regulated voltage at a regulator-output terminal 17. Thus, a complete power source includes unregulated source 11 and regulator 15. A pair of relay contacts 21a connect terminal 17 to a load-input terminal 24 when a relay 21 is energized. Other switching means can be employed instead of the relays.

A transistor 28 having an emitter 29, a base 30 and a collector 31 is employed to sense an over-current condition. A transistor 35 having an emitter 36, a base 37 and a collector 38 is employed to sense an under-voltage condition. A transistor 42 having an emitter 43, a base 44 and a collector 45 is employed to sense an over-voltage condition. The coil of relay 21 is connected between emitter 38 and a terminal 48. Terminal 48 is connected to a suitable reference voltage such as −10 volts. When current flows through the coil of relay 21, the relay is energized and relay contacts 21a are closed. A diode 51 connected across the coil of relay 21 prevents an excessive voltage from developing across the coil when current through the coil changes.

A current source 54 and a zener diode 55 provide a constant voltage with respect to ground potential at junction point 56. The zener diode has the characteristic of providing a constant voltage drop across its terminals for a wide range of amplitude of currents flowing through the diode in a reverse direction. Therefore, the voltage difference between junction point 56 and ground will be constant. A potentiometer 59 connected between junction point 56 and ground supplies a reference voltage to base 37. The value of the reference voltage supplied to base 37 determines the under-voltage value at which relay 21 will be de-energized. When relay 21 is de-energized relay contacts 21a open thereby disconnecting voltage regulator 15 from terminal 24.

A potentiometer 62 connected between junction point 56 and ground supplies a reference voltage to base 44. The value of the reference voltage at base 44 determines the over-voltage value at which relay 21 will be de-energized.

Power source 11 provides a suitable voltage such as +10 volts. Current from source 11 flows through a potentiometer 64 to terminal 16 through regulator 15 and contacts 21a to load terminal 24. This current provides the voltage polarities shown between a first current terminal 65 and a signal-output terminal 67 of potentiometer 64. A voltage divider comprising resistors 68 and 69 provides a voltage to render transistor 28 nonconductive when voltage and current conditions in the circuit shown are normal. The voltage between base 30 and emitter 29 is determined by the voltage drop across a diode 72, the voltage drop between terminal 67 of potentiometer 64 and terminal 12 and the voltage drop across resistor 68. The voltage drop across diode 72 and the voltage drop across resistor 68 are substantially constant so the current through potentiometer 64 determines the over-current value at which transistor 28 is rendered conductive. When transistor 28 is rendered conductive current through transistor 28 provides a voltage at base 37 which renders transistor 35 nonconductive and de-energizes relay 21. Thus, the value of the voltage supplied to base 30 by potentiometer 64 determines the over-current value at which relay 21 is de-energized.

A capacitor 71 provides filtering between emitter 29 and base 30. Capacitor 71 normally has a small charge of the polarity shown. When current through potentiometer 64 increases for a few microseconds due to a brief change in load current, capacitor 71 maintains a constant voltage between emitter 29 and base 30 so that transistor 28 remains nonconductive.

Diode 72 and a resistor 73 provide temperature compensation for transistor 28. Diode 72 is composed of the same type of semiconductor material as transistor 28 so that the temperature vs. voltage characteristics of diode 72 and transistor 28 are substantially the same. As temperature increases, the voltage required between emitter 29 and base 30 to render transistor 28 conductive decreases. At the same time, the increase in temperature causes the voltage drop across diode 72 to decrease so that the over-current value at which transistor 28 is rendered conductive does not change as temperature changes.

Approximately +.5 volt is required between emitter 36 and base 37 to render silicon transistor 35 conductive. Germanium transistor 28 and germanium transistor 42 each require approximately +.2 volt between emitter and base to render these transistors conductive.

Potentiometer 59 is adjusted so that relay 21 will be de-energized at the under-voltage limit desired. For example, if the minimum voltage desired at terminal 24 is +3 volts and, since +.5 volt is required between emitter 36 and base 37 to render silicon transistor 35 conductive, the arm of potentiometer 59 is set at +2.5 volts. Relay contacts 21a may be closed by pressing a push button 75 or contacts 21a may be closed by an auxiliary circuit, not shown. When the voltage at terminal 24 is greater than +3 volts, the voltage between emitter 36 and base 37 is greater than +.5 volt so that transistor 35 is rendered conductive. A current flows from terminal 12, through potentiometer 64, regulator 15, transistor 35 and the coil of relay 21 to terminal thereby energizing the relay so that contacts remain closed.

Potentiometer 62 is adjusted so that relay 21 will be de-energized at the over-voltage limit desired. For example, if the maximum voltage desired at terminal 24 is +3.3 volts and since +.2 volt is required between emitter 43 and base 44 to render germanium transistor 42 conductive, the arm of potentiometer 62 is set at +3.1 volts. When the voltage at terminal 24 is less than +3.3 volts, the voltage between emitter 43 and base 44 is less than +.2 volt so that transistor 42 is nonconductive. When transistor 42 is nonconductive the voltage at junction point 66 is determined only by the position of the arm of potentiometer 59 so that transistor 35 is conductive and relay 21 remains energized.

Potentiometer 64 is adjusted for the over-current limit desired. For example, if the maximum current desired from terminal 12 is 2 amperes, resistors 68 and 69 and potentiometer 64 are chosen so that the voltage between emitter 29 and base 30 is +.2 volt when 2 amperes flow through potentiometer 64. The voltage divider comprising resistors 68 and 69 delivers a typical voltage of +9.55 volts at emitter 29. Current through diode 72 provides a voltage drops of approximately .25 volt of the polarity shown across diode 72. Potentiometer 64 is adjusted so that the resistance between terminal 12 and the arm of the potentiometer is .2 ohm. When current through potentiometer 64 is less than 2 amperes the voltage drop between terminal 12 and the arm of the potentiometer is less than .4 volt. The value of the voltage at base 30 is less than the value of the voltage at terminal 12 by the amount of the sum of the voltage drop across potentiometer 64 and the voltage drop across diode 72. The voltage at base 30 is more positive than +9.35 volts so that the voltage between emitter 29 and base 30 is less than the +.2 volt required to render transistor 28 conductive. Thus, when current through potentiometer 64 is less than 2 amperes, transistor 28 is nonconductive. The voltage at collector 31 is +2.5 volts due to the setting of the arm of potentiometer 59. When transistor 28 is nonconductive, transistor 35 is conductive and relay 21 remains energized.

During normal circuit operation the voltage at terminal 24 is between +3 and +3.3 volts so that transistor 35 is conductive and transistor 42 is nonconductive. The current through potentiometer 64 is less than the maximum allowable value so that transistor 28 is nonconductive. Thus, relay 21 is energized and contacts 21a are closed.

The three conditions which cause regulator-output terminal 24 to be disconnected from regulator terminal 17 will now be described.

(1) When the voltage at terminal 24 decreases to less than +3 volts, transistor 35 is rendered nonconductive. A voltage of +.5 volt is required between emitter 36 and base 37 to render transistor 35 conductive. With the arm of potentiometer 59 set at +2.5 volts, transistor 35 remains conductive until the voltage at emitter 36 decreases to less than +3 volts, whereupon transistor 35 is rendered nonconductive so that current no longer flows through the coil of relay 21. The relay is de-energized, contacts 21a open and the power source is disconnected from terminal 24.

(2) When the voltage at terminal 24 increases to more than +3.3 volts, transistor 42 is rendered conductive. A voltage of +.2 volt is required between emitter 43 and base 44 to render transistor 42 conductive. With the arm of potentiometer 62 set at +3.1 volts, transistor 42 remains nonconductive until the voltage at emitter 43 increases to more than +3.3 volts, whereupon transistor 42 is rendered conductive. When transistor 42 becomes conductive the voltage drop between emitter 43 and collector 45 is approximately .2 volt so that the voltage at junction point 66 increases to at least +3.1 volts. The voltage between emitter 36 and base 37 is now +.2 volt or less. Thus, transistor 35 is rendered nonconductive as +.5 volt is required between emitter 36 and base 37 to maintain transistor 35 conductive. Relay 21 is de-energized so that the power source is disconnected from terminal 24.

(3) When current through potentiometer 64 is more than 2 amperes, the voltage drop between terminal 12 and the arm of potentiometer 64 is more than .4 volt. The voltage drop across a typical diode 72 is .25 volt. The value of the voltage at base 30 is less than the value of the voltage at terminal 12 by the amount of the sum of the voltage drop shown across potentiometer 64 and the voltage drop across diode 72. Thus, the voltage at base 30 is less positive than +9.35 volts. The voltage at emitter 29 is +9.55 volts so the voltage between emitter 26 and base 30 is more than the +.2 volt required to render transistor 28 conductive. A current $I_1$ flows from terminal 12 through resistor 68, from emitter 29 to collector 31, and through potentiometer 59 to ground. Current $I_1$ provides the voltage polarities shown between the arm of potentiometer 59 and ground. This voltage drop across potentiometer 59 causes the voltage at base 37 of transistor 35 to be more positive than +3.3 volts so that transistor 35 is rendered nonconductive. Current no longer flows through the coil of relay 21. The relay is de-energized, contacts 21a open and the power source is disconnected from terminal 24.

Thus, the objects set forth herein are realized by the instant invention, wherein a novel arrangement of three transistors and one fast-acting relay protect a power source and the associated electronic load circuits against over-voltage, under-voltage and over-current conditions.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A circuit for protecting an electric power source comprising: a load-input terminal; a switching means, said switching means being connected between said source and said terimnal; a constant-voltage supply; and a comparator circuit, said comparator circuit being coupled to said source and to said supply, said comparator further benig coupled to said switching means, said comparator circuit comparing the voltage of said source with the voltage of said supply, said comparator circuit controlling said switching means to disconnect said source from said terminal when the voltage from the source is less than a first threshold value determined by said supply, said comparator circuit controlling said switching means to disconnect said source from said terminal when the voltage from the source is greater than a second threshold value determined by said supply.

2. A circuit for protecting an electric power source comprising: a load-input terminal; a switching means, said switching means benig connected between said source and said terminal; a constant-voltage supply; a comparator circuit, said comparator circuit being coupled to said source and to said supply, said comparator further being coupled to said switching means, said comparator circuit comparing the voltage of said source wtih the voltage of said supply, said comparator circuit controlling said switching means to disconnect said source from said terminal when the voltage from the source is less than a first threshold value determined by said supply; and a current sensing means, said means being coupled to said source and to said comparator circuit, said means providing a sensing voltage in response to the current from the source, said comparator circuit comparing the sensing voltage with the voltage of said supply, said comparator circuit controlling said switching means to disconnect said source from said terminal when the sensing voltage is greater than a second threshold value determined by said supply.

3. A circuit for protecting an electric power source comprising: a constant-voltage supply; a comparator circuit, said comparator circuit being coupled to said source and to said supply, said comparator circuit comparing the voltage of said source wtih the voltage of said supply, said comparator circuit disabling said source when the voltage from the source is more than a first threshold value determined by said supply; and a current sensing means, said means being coupled to said source and to said comparator circuit, said means providing a sensing voltage in response to the current from the source, said comparator circuit comparing the sensing voltage with the voltage of said supply, said comparator circuit disabling said source when the sensing voltage is greater than a second threshold value determined by said supply.

4. A circuit for protecting an electric power source comprising: a constant-voltage supply; a comparator circuit, said comparator circuit being coupled to said source and to said supply, said comparator circuit comparing the voltage of said source with the voltage of said supply, said comparator circuit disabling said source when the voltage from the source is less than a first threshold value determined by said supply, said comparator circuit disabling said source when the voltage from the source is more than a second threshold value determined by said supply; and a current sensing means, said means being coupled to said source and to said comparator circuit, said means providing a sensing voltage in response to the current from the source, said comparator circuit comparing the sensing voltage with the voltage of said supply, said comparator circuit disabling said source when the sensing voltage is greater than a third threshold value determined by said supply.

5. A circuit for protecting an electric power source comprising: first and second transistors each having a base, a collector and an emitter; first and second constant-voltage supplies, said base of said first transistor being coupled to said first supply, said base of said second transistor being coupled to said second supply; a switching means having a control member and a controlled member; a reference voltage, said control member of said means being connected between said collector of said first transistor and said voltage; and a load-input terminal, said controlled member of said means being connected between said source and said terminal, said controlled member of said means disconnecting said source from said terminal when no current flows through said control member of said means, said terminal being connected to said emitters of said first and second transistors, said collector of said second transistor being connected to said base of said first transistor.

6. A circuit for protecting an electric power source comprising: first and second transistors each having a base, a collector and an emitter; a constant-voltage supply, said base of said first transistor being coupled to said supply; a switching means having a control member and a controlled member; a reference voltage, said control member of said means being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said signal terminal of said sensing means being connected to said base of said second transistor, said first terminal of said sensing means being connected to said source, said controlled member of said switching means being connected between said load terminal and said second terminal of said sensing means, said controlled member of said switching means disconnecting said sensing means from said load terminal when no current flows through said control member of said switching means, said load terminal being connected to said emitter of said first transistor, said collector of said second transistor being connected to said base of said first tranistor, said emitter of said second transistor being connected to said first terminal of said sensing means.

7. A circuit for protecting an electric power source comprising: first, second and third transistors each having a base, a collector and an emitter; first and second constant-voltage supplies, said base of said first transistor being coupled to said first supply, said base of said second transistor being coupled to said second supply; a switching means having a control member and a controlled member; a reference voltage, said control member of said means being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said signal terminal of said sensing means being connected to said base of said third transistor, said first terminal of said sensing means being connected to said source, said controlled member of said switching means being connected between said load terminal and said second terminal of said sensing means, said controlled member of said switching means disconnecting said sensing means from said load terminal when no current flows through said control member of said switching means, said load terminal being connected to said emitters of said first and second transistors, said collector of said second transistor being connected to said base of said first transistor, said collector of said third transistor being connected to said base of said first transistor, said emitter of said third transistor being connected to said first terminal of said sensing means.

8. A circuit for protecting an electric power source and a voltage regulator comprising: first, second and third transistors each having a base, a collector and an emitter; first and second constant-voltage supplies, said base of said first transistor being coupled to said first supply, said base of said second transistor being coupled to said second supply; a switching means having a control member and a controlled member; a reference voltage, said control member of said means being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said signal terminal of said sensing means being connected to said base of said third transistor, said first terminal of said sensing means being connected to said source, said second terminal of said sensing means being connected to said regulator, said controlled member of said switching means being connected between said load terminal and said regulator, said controlled member of said switching means disconnecting said regulator from said load terminal when no current flows through said control member of said switching means, said load terminal being connected to said emitters of said first and second transistors, said collector of said second transistor being connected to said base of said first transistor, said collector of said third transistor being connected to said base of said first transistor, said emitter of said third transistor being connected to said first terminal of said sensing means.

9. A circuit for protecting an electric power source comprising: first, second and third transistors each having a base, a collector and an emitter; first and second constant-voltage supplies, said base of said first transistor being coupled to said first supply, said base of said second transistor being coupled to said second supply; a switching means having a control member and a controlled member; a reference voltage, said control member of said means being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said first terminal of said sensing means being connected to said source, said controlled member of said switching means being connected between said load terminal and said second terminal of said sensing means, said controlled member of said switching means disconnecting said sensing means from said load terminal when no current flows through said control member of said switching means, said load terminal being connected to said emitters of said first and second transistors, said collector of said second transistor being connected to said base of said first transistor, said collector of said third transistor being connected to said base of said first transistor, said emitter of said third transistor being connected to said first terminal of said sensing means; and a diode, said diode being connected between said signal terminal of said sensing means and said base of said third transistor, said diode being composed of a semiconductor material having temperature characteristics similar to material used in said third transistor.

10. A circuit for protecting an electric power source comprising: first, second and third transistors each having a base, a collector and an emitter; first and second constant-voltage supplies, said base of said first transistor being coupled to said first supply, said base of said second transistor being coupled to said second supply; a relay having a coil and first and second contacts, said contacts being closed by a current through said coil, a reference voltage, said relay coil being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said signal terminal of said sensing means being connected to said base of said third transistor, said first terminal of said sensing means being connected to said source, said first relay contact being connected to said load terminal, said second relay contact being connected to said second terminal of said sensing means, said load terminal being connected to said emitters of said first and second transistors, said collector of said second transistor being connected to said base of said first transistor, said collector of said third transistor being connected to said base of said first transistor, said emitter of said third transistor being connected to said first terminal of said sensing means.

11. A circuit for protecting an electric power source and a voltage regulator comprising: first, second and third transistors each having a base, a collector and an emitter; first and second constant-voltage supplies, said base of said first transistor being coupled to said first supply, said base of said second transistor being coupled to said second supply; a relay having a coil and first and second contacts, said contacts being closed by a current through said coil, a reference voltage, said relay coil being connected between said collector of said first transistor and said voltage; a load-input terminal; and a current sensing means, said sensing means having first and second current terminals and a signal output terminal, said sensing means providing a signal voltage at said signal terminal in response to the current through said sensing means, said signal terminal of said sensing means being connected to said base of said third transistor, said first terminal of said sensing means being connected to said source, said first relay contact being connected to said load terminal, said regulator being connected between said second relay contact and said second terminal of said sensing means, said load terminal being connected to said emitters of said first and second transistors, said collector of said second transistor being connected to said base of said first transistor, said collector of said third transistor being connected to said base of said first transistor, said emitter of said third transistor being connected to said first terminal of said sensing means.

12. A circuit for protecting an electric power source and a voltage regulator comprising: first, second and third transistors each having a base, a collector and an emitter; first and second constant-voltage supplies, said base of said first transistor being coupled to said first supply, said base of said second transistor being coupled to said second supply; a relay having a coil and first and second contacts, said contacts being closed by a current through said coil; a reference voltage, said relay coil being connected between said collector of said first transistor and said voltage; a load-input terminal; a current sensing means, said means having first and second current terminals and a signal output terminal, said means providing a signal voltage at said signal terminal in response to the current through said means, said first terminal of said means being connected to said source, said first relay contact being connected to said load terminal, said regulator being connected between said second relay contact and said second terminal of said means, said load terminal being connected to said emitters of said first and second transistors; a voltage divider having first and second input terminals and a tapped output terminal, said first terminal of said divider being connected to said source, said second terminal of said divider being connected to ground, said output terminal of said divider being connected to said emitter of said third transistor; and a diode, said diode being connected between said signal terminal of said means and said base of said third transistor, said diode being composed of a semiconductor material having temperature characteristics similar to material used in said third transistor, said collectors of said first and third transistors being connected to said base of said first transistor.

13. A circuit for protecting an electric power source comprising: first and second transistors each having a base, a collector and an emitter; first and second constant-voltage supplies, said base of said first transistor being coupled to said first supply, said base of said second transistor being coupled to said second supply; a switching means having a control member and a controlled member; a reference voltage, said control member of said means being connected between said collector of said first transistor and said voltage; and a load-input terminal, said controlled member of said means being connected between said source and said terminal, said controlled member of said means disconnecting said source from said terminal when there is a predetermined change in the amount of current flowing through said control member of said means, said terminal being connected to said emitters of said first and second transistors, said collector of said second transistor being connected to said base of said first transistor.

References Cited by the Examiner
UNITED STATES PATENTS

| 3,101,441 | 8/1963 | Curry | 317—33 X |
| 3,230,440 | 1/1966 | Kleiner | 317—33 X |
| 3,239,718 | 3/1966 | Fegley | 317—32 |

MILTON O. HIRSHFIELD, *Primary Examiner.*

J. D. TRAMMELL, *Assistant Examiner.*